No. 642,351. Patented Jan. 30, 1900.
H. A. MIDDLETON.
TIRE.
(Application filed Nov. 28, 1899.)
(No Model.)
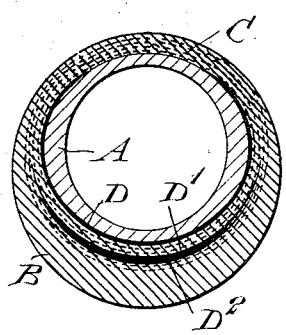
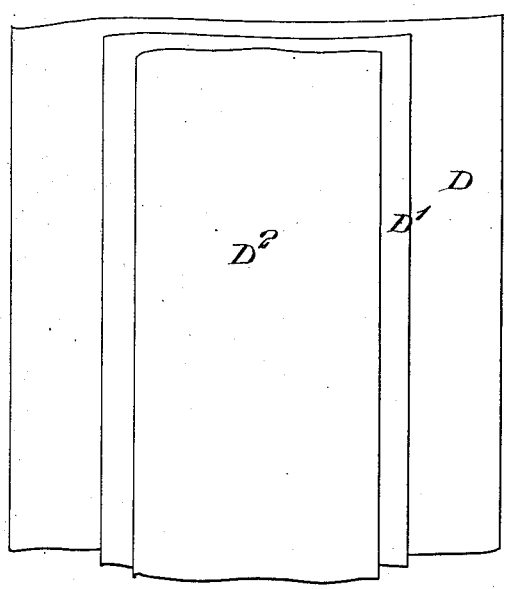
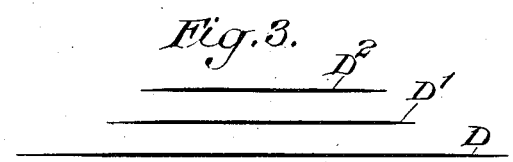
Witnesses:
George Barry Jr.
Edward Vieser
Inventor:
Henry A. Middleton
by attorneys

UNITED STATES PATENT OFFICE.

HENRY A. MIDDLETON, OF ERIE, PENNSYLVANIA.

TIRE.

SPECIFICATION forming part of Letters Patent No. 642,851, dated January 30, 1900.

Application filed November 28, 1899. Serial No. 738,530. (No model.)

*To all whom it may concern:*

Be it known that I, HENRY A. MIDDLETON, a citizen of the United States, and a resident of Erie, in the county of Erie and State of Pennsylvania, have invented a new and useful Improvement in Tires, of which the following is a specification.

My invention relates to an improvement in tires, and more particularly to that class known as "pneumatic" tires, one object being to provide one or more strips of punctureless material in the tire, thus rendering the tire puncture-proof, the strip or strips of punctureless material being composed of such materials as will not impair the resiliency of the tire to any material degree.

A further object is to thicken the side walls of the air-tube portion of the tire, so as to materially strengthen the sides of the tire, so that if the tire should be ridden deflated the liability of the tire to become cracked along its sides is obviated.

With these ends in view my invention consists in providing the tire with one or more strips of puncture-proof material which may be either embedded in the walls of a single-tube tire between the air-tube portion and the sheath or inserted between the inner and outer tubes of a double-tube tire, which strip is composed of a flexible fabric treated with a mixture of comminuted fiber, rubber, sulfur, litharge, antimony, and a coloring material—such, for instance, as vermilion.

A practical embodiment of my invention is represented in the accompanying drawings, in which—

Figure 1 represents in cross-section a pneumatic tire of the single-tube type having three layers or strips of my improved punctureless material embedded therein between the air-tube and the tubular sheath. Fig. 2 is a top plan view of portions of three of my improved punctureless strips—such, for instance, as the three strips which are represented in Fig. 1.
Fig. 3 is a transverse sectional view of the same.

The air-tube of the tire is denoted by A, and it is preferably made of a soft rubber, the side walls of the air-tube being thickened to strengthen the sides of the tire. This air-tube portion of the tire presents in cross-section a circular inner wall and an elliptical outer wall.

The tubular sheath is denoted by B, and a number of rows of fabric C are embedded in the tire between the air-tube portion A and the tubular sheath. The walls of the sheath are preferably thickened along the tread portion of the tire, as shown.

I embed in the tire between the air-tube portion and the tubular sheath one or more strips of punctureless material. In the accompanying drawings I have represented three of these strips, the widest strip (denoted by D) being located between the inner layer of fabric and the outer wall of the air-tube portion, the strip being of sufficient width to extend from the tread portion upwardly around both sides of the air-tube portion, so as to render the sides punctureless and also stiffen them. A second strip D', of considerably less width than the strip D, is embedded between the layers of fabric along the tread portion of the tire, and a third strip $D^2$ is embedded between the layers of fabric along the tread portion of the tire, which last-named strip is of a little less width than the strip D'.

To produce a strip which will be non-puncturable and at the same time retain to the highest degree its resiliency and pliability, so as not to affect the resiliency of the tire to any material degree, I proceed in the following manner: I mix fiber in a comminuted form—such, for instance, as manila fiber—with rubber in its soft state. I add thereto sulfur for the purpose of vulcanizing the rubber and fiber. To this mixture I add lime and litharge to toughen the same. I also add antimony, which serves the double purpose of toughening and also assisting the sulfur in binding the mixture. To this mixture, if so desired, I may add a coloring-matter—such, for instance, as vermilion—to impart a distinguishing color to the strip.

The proportions of the several parts of the composition which I find produce good results are as follows: comminuted fiber, thirty pounds; rubber, eight pounds; sulfur, four pounds; lime, four pounds; litharge, three pounds; antimony, one pound; and a coloring-matter—as, for instance, vermilion—one-quarter pound.

The mixture above described is caused to thoroughly impregnate and coat a sheet of fabric, preferably by starting with the sheet of fabric upon a roll and adding the several parts of the mixture thereto and causing the roll to be engaged by another roll for spreading the mixture evenly to the desired width. The sheet of punctureless material thus formed may be cut up into strips of the desired widths. These strips may be embedded in the walls of a tire of the single-tube type, as represented in the accompanying drawings, or they may be used separately wherever it is desired to place a punctureless strip or protector.

What I claim is—

1. The combination with a pneumatic tire, of a punctureless strip inserted in its wall, the said strip comprising a fabric impregnated and coated with a layer of comminuted fiber, rubber, a toughening material, such as litharge and a binder, such as sulfur or antimony.

2. A punctureless strip for tires comprising a fabric impregnated and coated with a mixture composed of comminuted fiber, rubber, a toughening material, such as litharge, and a binder, such as sulfur or antimony.

3. A punctureless strip for tires comprising a fabric impregnated and coated with a mixture composed of comminuted fiber, rubber, litharge, antimony and sulfur.

4. A punctureless strip for tires comprising a fabric impregnated and coated with a mixture composed of comminuted fiber, rubber, litharge, antimony, sulfur and lime.

5. A punctureless strip for tires comprising a fabric impregnated and coated with a comminuted fiber, rubber, a toughening material, such as litharge, a binder, such as sulfur or antimony, and a coloring material, such as vermilion.

6. In a pneumatic tire comprising a tubular sheath, an air-tube and one or more layers of fabric interposed between the sheath and air-tube, the said air-tube having its side walls materially thickened to strengthen the tire at those points, substantially as set forth.

7. A pneumatic tire comprising a tubular sheath, an air-tube and one or more layers of fabric interposed between the sheath and the air-tube, the said air-tube having, in cross-section, a circular inner wall and an elliptical outer wall for producing thickened portions at the sides of the air-tube, substantially as set forth.

In testimony that I claim the foregoing as my invention I have signed my name, in presence of two witnesses, this 4th day of November, 1899.

HENRY A. MIDDLETON.

Witnesses:
C. H. WALTERS,
GEO. W. SHIVELEY.